United States Patent [19]
Rich

[11] 3,872,369
[45] Mar. 18, 1975

[54] PULSE COUNTING PHASE MODULATION METHOD AND APPARATUS FOR CONTROLLING A SERVO-MECHANISM

[75] Inventor: Leonard G. Rich, West Hartford, Conn.

[73] Assignee: The Gerber Scientific Instrument Company, South Windsor, Conn.

[22] Filed: Sept. 28, 1973

[21] Appl. No.: 401,572

Related U.S. Application Data

[63] Continuation of Ser. No. 169,263, Aug. 5, 1971, abandoned.

[52] U.S. Cl. ............... 318/603, 318/608, 340/347
[51] Int. Cl. ...................... G05b 19/28, G05b 1/01
[58] Field of Search ............ 318/603, 608; 340/347

[56] References Cited
UNITED STATES PATENTS
3,539,895  11/1970  McGee ........................... 318/603 X
3,591,781  7/1971  Brenza ........................ 318/603 UX Primary Examiner—T. E. Lynch
Attorney, Agent, or Firm—McCormick, Paulding & Huber

[57] ABSTRACT

A digital control apparatus receives command signals in digital form and produces two phased waveforms which are applied to a phase responsive servomechanism to move the output member of the mechanism through a cyclic succession of discrete output positions. The control apparatus includes a register which receives digital input commands corresponding to desired output positions and holds the commands in temporary storage in binary code. A digital counter driven cyclically by a clock reproduces the full series of command signals, corresponding to all of the output positions in the cyclic succession, in binary code during each count cycle. A comparator connected between the digital register and the counter detects the coincidences of the command signals and the digital count and during each count cycle produces a phased timing signal which identifies a given command signal and output position by its phase relationship with the count cycle. The phased timing signal is applied to a phase responsive motor control of the servomechanism and causes the output member to move to the commanded positions. A feedback sensor connected to the output member produces a phased feedback signal referenced to the count cycle, and the feedback signal is applied to the motor control in conjunction with the phased command signals to provide conventional closed loop stability.

18 Claims, 4 Drawing Figures

PULSE COUNTING PHASE MODULATION METHOD AND APPARATUS FOR CONTROLLING A SERVO-MECHANISM

CROSS REFERENCE TO RELATED APPLICATION

This application is a continuation of U.S. Pat. application Ser. No. 169,263, filed Aug. 5, 1971, now abandoned.

BACKGROUND OF THE INVENTION

This invention relates to a method and apparatus for controlling a servomechanism and, more particularly, is directed to a digital control system for moving a servomechanism output member through a cyclic succession of output positions which are represented by a corresponding series of command signals.

There already exist in the prior art digital controls which are integrated with analog servo systems. Furthermore, digital-to-analog decoding systems which are compatible with phase responsive analog servo systems are known as indicated in U.S. Pat. No. 3,175,138 and No. 3,078,400. In each of the cited patents, apparatus is disclosed for producing two phased control signals that are utilized by a servomechanism to position an output member in any one of a finite number of output positions arranged in a cyclic succession. The output positions may, for example, correspond to the rotational positions of a shaft which can be uniquely identified by the phase relationship of the waveforms. If desired, any number of shaft rotations can be had by repeatedly commanding the shaft to assume each one of the rotational positions in the cyclic succession. While each of the input command signals to such a system is unique to only one shaft position, it is possible through appropriate programming of the commands to drive the output shaft through a specific number of complete rotations to a specific rotational position of the shaft. By this process, very accurate translation of an object, for example, a plotting pen or recording strip, can be achieved. The phased waveform can also be used to position a magnesyn in a linear array of output positions which occur in cyclic succession.

In each of the referenced patents, the two phased control signals are waveforms produced by two digital counters running simultaneously at the same rate and with a fixed differential count corresponding to the phased relationship of the waveforms. To insert a new command signal from a digital source both counters must be stopped, a new command inserted in one of the counters and then both counters started simultaneously by another command. To insert new commands and maintain phase discrimination, the counters are stopped at the end of an even number of counting cycles and after the output member has reached the previously commanded position; therefore the error signal in the servo loop and the torque of the servo motor returns to zero between each of a series of commands. In a system where accuracy of positioning is required together with high frequency response, it is preferably to be able to continuously introduce command signals at any phase of the counting cycle and at any position of the output member.

It is accordingly an object of the present invention to disclose a digital control apparatus which generates phased control signals to be used by a phase sensitive analog servomechanism to provide an accurate, high response output.

SUMMARY OF THE INVENTION

The present invention resides in a method and apparatus for controlling the output of a servomotor in accordance with digital command signals. The apparatus which carries out the method of the present invention includes a cyclically driven digital counter having an output providing a reference waveform at a frequency which is a sub-multiple of the digital counting rate. A digital command signal register has an input through which the digital command signals for positioning the servomotor output are received for temporary storage. Comparator means is connected between the digital counter and the command signal register for comparing the digital counts and the digital command signals and producing coincidence or phased timing signals at each coincidence of the digital counts and the commands. Generating means connected to the comparator means and responsive to the coincidence signals produces a command signal waveform having the same frequency as the reference waveform and a phase relationship with the reference waveform which is uniquely related to the command signal in the register. Phase responsive motor control means connected with the servomotor, the generating means and the digital counter includes a phase detector responsive to the reference waveform and the command signal waveform for positioning the output of the servomotor in accordance with the phase relationship of the waveforms. By means of this apparatus, the digital commands are rapidly and continuously processed to produce the two phased waveforms which drive an analog servomechanism.

DESCRIPTION OF THE PREFERRED EMBODIMENTS

The present invention relates to a digital-to-analog control method and apparatus that is utilized with a phase sensitive servo system to precisely position an output member. The control apparatus is specifically designed to move a rotational output member between a cyclic succession of output positions and therefore is readily to servo systems having rotary outputs; however, the apparatus can also be employed in systems having an output member such as a magnesyn movable in a linear fashion between positions that are interrelated by a cyclic succession of commands.

Figure 1:
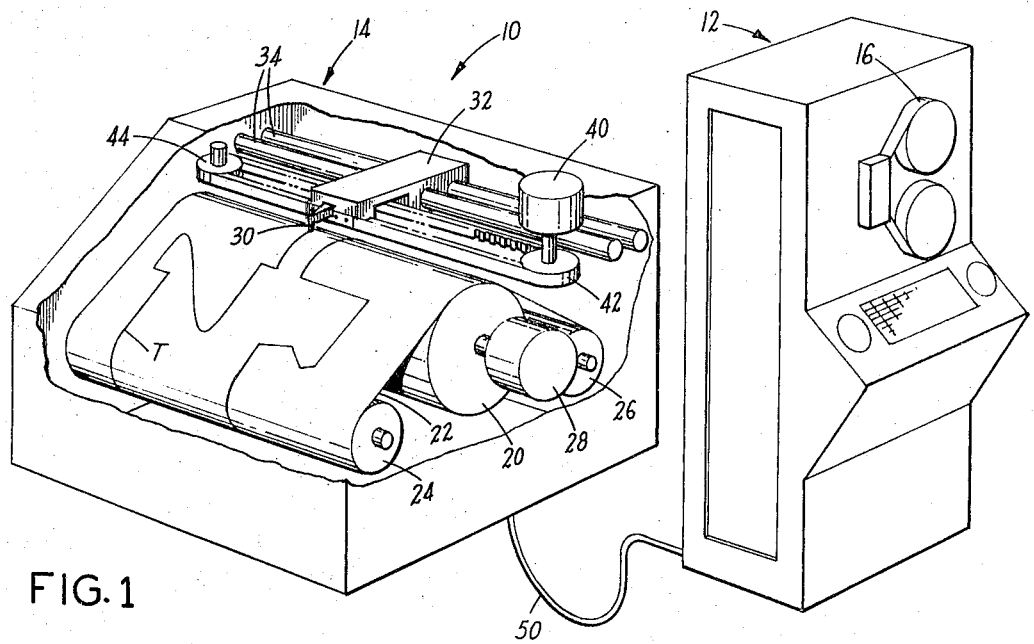
FIG. 1 is a perspective view of a digital-to-analog drum plotting system embodying the digital control apparatus of the present invention.

Although the present invention has utility in many types of servo systems, it will be described hereinafter as embodied in a drum plotting system as that shown in FIG. 1. The drum plotting system, generally designated 10, includes a digital computer 12 and a drum plotter 14 which serves as a display device for the output of the computer 12. The computer 12 may be either a general or special purpose computer that performs desired data handling operations and receives input information from a memory device such as the memory tape 16. The particular information channels and the functions of the computer form no part of the present invention and hence are not described in detail. For the purpose of understanding the invention the computer 12 is merely a digital command signal source providing the digital information to be transformed into a visual display by the drum plotter 14.

The drum plotter 14 is comprised of the plotting drum 20 which engages and translates a strip of recording paper 22 back and forth in its longitudinal direction between two take-up rolls 24 and 26 located at opposite sides of the drum 20. The drum 20 engages the paper 22 by means of sprocket teeth (not shown) at each end of the drum and mating holes at the lateral sides of the paper to insure that rotation of the drum accurately produces corresponding displacements of the recording paper. Take-up motors and slip clutches (not shown) are connected to the take-up rolls 24 and 26 to maintain slight tension on the segments of the paper stretched between the drum and rolls and insure that the paper is fed from or drawn onto the take-up rolls in an orderly fashion as the plotting drum 20 rotates in each direction. A servomotor 28 mounted to the housing of the plotter 14 is connected in driving relationship with the drum 20 either directly or through a gear reduction mechanism to cause the drum to rotate during the plotting operation. A recording pen 30 is pivotally mounted for slight vertical movement away from the drum 20 on a slidable carriage 32 and is positioned by the carriage over the segment of the drum 20 on which the paper 22 rests to produce a trace T on the recording paper 22 when urged downwardly toward the drum 20. The carriage 32 translates in a lateral direction relative to the strip of recording paper 22 on a pair of guide rails 34 fixed to the housing of the plotter 14. Movement of the carriage 32 is controlled by a servomotor 40 that drives a toothed belt 42 engaged with the carriage 32 and stretched over a guide pulley 44 mounted to the housing of the plotter 14.

As shown, the drum plotter may be considered to have three control axes to which information must be supplied in order to accurately produce a trace on the paper 22 according to the digital data provided by the computer 12. The one control axis is related with longitudinal motions of the paper 22 produced by the rotation of the drum 20 and servomotor 28. A second control axis is related to the translational motions of the pen and carriage 32 in a lateral direction over the paper 22 and drum 20. A third axis is related to the pivotal motions of the pen 30 in the carriage 32 which cause the pen to be lifted from or pressed against the recording paper. Such pivotal motions can be controlled by a small electrical solenoid mounted in the carriage 32. By appropriately controlling all of the motions related to the three axes in accordance with the digital commands transmitted to the plotter from the computer 12 through the command cable 50, an accurate trace of this digital data is produced on the recording paper 22.

The digital control apparatus which is the subject of the present invention is utilized for driving the servomotor 28 and the drum 20 in the one control axis to accurately position the recording paper 22 in the longitudinal direction during a recording process. Although the output motion of the drum 20 is principally rotational, the control apparatus can also be used to produce the lateral translations of the recording pen 30 and the carriage 32.

Figure 2:
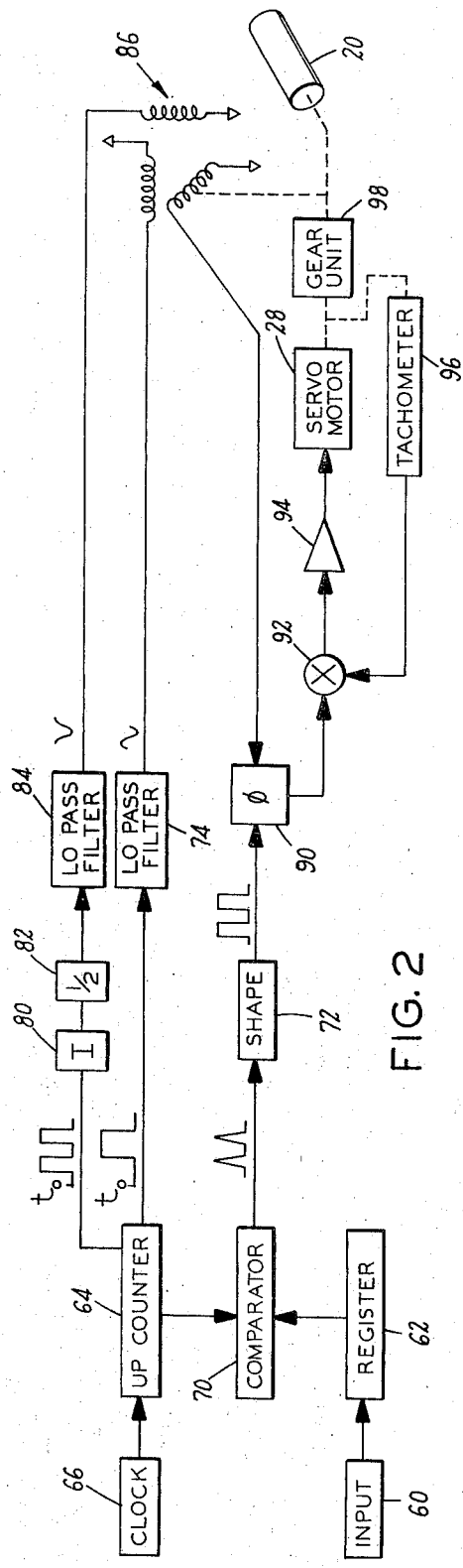
FIG. 2 is a schematic diagram showing one embodiment of the control apparatus for the plotting system of FIG. 1.

FIG. 2 is a schematic diagram of apparatus in the plotter 14 which controls the rotation of the plotting drum 20. Command signals from the computer 12 in a digital form and representing a desired output position of the drum 20 are supplied through an input device 60 to a digital storage register 62 where the commands are held in temporary storage. In one form of the invention, the register 62 is an up/down binary counter and the data supplied from the input device 60 includes sign information specifying the direction in which the counter is to count, up or down, and counting pulses which vary the cumulative sum or count in the register. The counts appearing in sequence in the register correspond respectively to the desired positions to be assumed in sequence by the plotting drum 20. For example, if register 62 is an eight-bit binary counter having a maximum count of 256, each of the counts represents one of 256 discrete rotational positions of the drum 20 and each pulse added to the register corresponds to a command to rotate the drum by approximately 1.4° to the next adjacent position in the cyclic succession of output positions. Of course, the number of discrete positions which may be commanded can be increased or decreased by correspondingly increasing or decreasing the count capacity of the register 62.

The control apparatus also includes a digital up counter 64 which has a binary count capacity matching that of the register 62. For example, if the register 62 is the eight-bit binary counter given in the example above, the up counter 64 is also an eight-bit counter. The counter 64 is driven by a crystal-controlled clock 66 and runs continuously in the up direction to its maximum count. On the subsequent clock pulse, the counter turns from the maximum count to zero and begins another count cycle. One count cycle follows another as long as the clock 66 continues to pulse the counter 64.

Connected between the register 62 and counter 64 is a digital comparator 70 which continuously compares the count of counter 64 with the commands stored in register 62. When the command and the count match, or are in coincidence, the comparator 70 produces a pulse which has a phase relationship with the counting cycle that is uniquely related to the command in the register 62. In theory, the counter reproduces a full series of command signals in sequence in a binary or other coded form during one count cycle. The coincidence pulse produced by the comparator 70 is therefore a phased timing signal having a phase relationship to the counting cycle which corresponds to the desired position of the plotting drum 20 with respect to a fixed zero position. When all but the most-significant bit stages of the counter 64 and register 62 are in coincidence, the comparator 70 produces a second pulse at a point 180° in the count cycle or one-half of a count cycle after the first pulse produced at the coincidence of all the word bits. The two pulses are transmitted to a shaping network 72 which in one form is a flip-flop that is set by the first of the pulses and reset by the second of the pulses. The shaping network 72 generates a command signal waveform taking the shape of a square wave having the same frequency as the count cycles of the counter 64 and a phase relationship with the count cycles directly proportional to the command in the register 62.

The command signal waveform is utilized with a reference waveform produced by the up counter 64 in a phase responsive analog servo system including the servomotor 28 to position the plotting drum 20. The reference waveform in the embodiment of the invention having a binary up counter is derived from the most-significant bit stage of the counter. The output of the bit stage is a square wave having a frequency which is a submultiple of the counting rate, or the pulse rate of the clock 66, and is equal to the frequency of the counting cycles. As indicated, the square wave establishes a time reference $t_0$ from which other signals in the system are based. The square wave is passed through a low pass filter 74 which has an output on which the fundamental of the square wave apperas as a sine function in fixed phase relationship with the reference waveform.

The second-most-significant bit stage of the counter 64 also has an output which provides a square wave at twice the fundamental frequency derived from the filter 74. The square wave at the higher frequency passes through a waveform inverter 80 to change the phase of the wave by 180° and then passes through a frequency divider 82 which reduces the frequency by a factor of two to that of the square wave from the most-significant bit stage of a counter 64. The fundamental of the square wave from the frequency divider 82 is derived by the low pass filter 84. The outputs of filters 74 and 84 are sine and cosine waves phased at 90° to one another with frequencies equal to that of the reference waveform and are utilized to excite the respective field windings of a resolver 86 which serves as a feedback position sensor for the plotting drum 20. The resolver 86 has a rotor winding connected for rotation directly to the shaft of the drum 20 and as a result of the excitation by the sine and cosine waves from the filters 74 and 84, the output signal of the resolver is a sinusoid having a phase relationship with that of the reference waveform proportional to the rotational position of the plotting drum 20. The phased sinusoid is utilized as a feedback signal in the phase responsive motor control which rotates the servomotor 28 and the plotting drum 20.

The phase responsive motor control for the servomotor 28 has a conventional closed loop, analog design. The command waveform from the shaping network 72 and the feedback signal from the resolver 86 are compared by a phase detector 90 which produces a position error signal that is fed to a summing amplifier 92 and power amplifier 94 which drives the servomotor 28. A motor tachometer 96 senses the output speed of the servomotor and provides a rate damping signal to the summing amplifier 92 for summation with the position error signal. The servomotor output shaft is connected through a gear reduction unit 98 to the plotting drum 20. If desired, a pulse tachometer connected between the input device 60 and the summing amplifier 92 can provide feed forward which when mixed with the rate damping signal of tachometer 96 provides zero error for constant acceleration.

It is an important feature of the present invention that digital commands can be introduced into the register 62 at any phase of the count cycle of the counter 64 and without having a zero error signal in the servoloop. It will be understood that in the steady state condition with zero position error in the servoloop, the clock 66 and the counter 64 continue to run and produce the reference waveform, and the comparator 70 and shaping network 72 continue to produce the command signal waveform. The phase relationship between the reference waveform and the command waveform remains constant and holds the plotting drum 20 in the desired position. When a new command is transmitted from the input device 60 to the register 62, the phase of the timing signals produced by comparator 70 and correspondingly the phase of the command signal waveform from the shaping network 82 are changed. The phase detector 90 is no longer balanced and produces an error signal which energizes the servomotor 28 and positions the plotting drum 20 at the commanded position. The feedback signal from the resolver 86 causes the error signal to return to zero.

Figure 3:
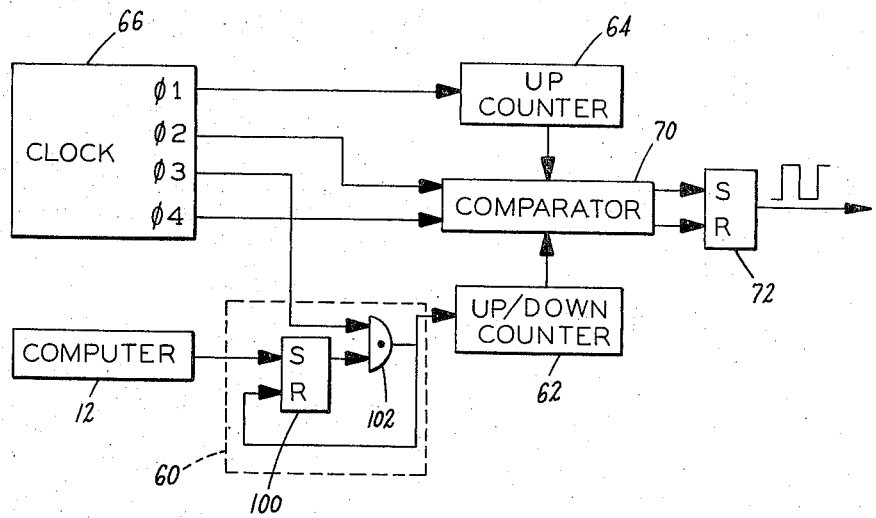
FIG. 3 is a schematic diagram in greater detail of the input elements of the control apparatus in FIG. 2.

FIG. 3 shows in diagram form the timing circuits and the components of the input device 60 which permit new command signals from the computer 12 to be introduced into the register 62 in a consecutive sequence at any phase of the count cycle and without interrupting the count cycles. The register 62 is shown to be an up/down binary counter which is connected to the computer 12 through the input device 60 comprised of a flip-flop 100 and an AND gate 102. For the purposes of discussion, it will be assumed that the computer 12 provides command pulses one at a time or serially to change the cumulative total in the up/down counter although it is also possible to have parallel loading of the register 62 if desired. It is also assumed that sign information from the computer 12 has already been supplied to the up/down counter to establish the direction in which the counter will be pulsed.

The clock 66 which drives the binary up counter 62 is shown as a multiphase clock and is also connected to the comparator 70 and the AND gate 102. The outputs of the multiphase clock provide non-overlapping pulses in time-phased pulse trains. The output carrying the first phase is connected to the up counter 64. The outputs carrying the second and fourth phases are connected to the comparator 70 and the output carrying the third phase is connected to the AND gate 102. A command phase from the computer is stored in the flip-flop 100 until a pulse in the third phase gates, the AND gate ON and loads the up/down counter. It will also be noted that the flip-flop 100 is reset for subsequent command pulses each time a command pulse is gated into the counter 62. The frequency of the clock pulses in each pulse train is the same and is selected to the substantially larger than the maximum output frequency of pulses from the computer. For example, if the maximum output frequency of the computer is 20kc, each phase of the clock 66 might operate at a frequency of 2mc. A system operating at these frequencies would allow generally no more than two digital command pulses to be entered into counter 62 during each counting cycle of counter 64.

The multiphase outputs of clock 66 allow the input information stored in flip-flop 102 to be entered into counter 62 without interrupting the count cycle and allow comparisons between the counters 62 and 64 to be made at any phase of the counting cycle without having the data in either counter change at a time when a comparison is being made. Also, to prevent an input pulse from being missed by the comparator 70 when a pulse is loaded while the counts are the same and the counters are running in opposite directions, the second phase and the fourth phase of the clock 66 gate the comparator 70 on before and after the third phase loads the counter 62. Although the double gating of the comparator 70 generally produces two successive pulses at each of the inputs of flip-flop 72 during a count cycle, only the first of these pulses changes the state of the flip-flop.

It should be noted that the two outputs of the comparator 70 are connected respectively to the set and reset inputs of flip-flop 72. The output of the comparator connected to the set input is associated with a coincidence of the corresponding bits in all of the bit stages in the binary counters 62 and 64 and the output connected to the reset input provides the coincidence signal when the corresponding bits in all of the bit stages other than the most-significant bit stages are coincident and the bits in the most-significant bit stages are not alike. The flip-flop 72 is, therefore, set and reset during each counting cycle at intervals which are 180° apart and the square wave output of the flip-flop acquires the period and frequency of the count cycles.

It will thus be seen that the phased clock pulses which operate the counter 64, the comparator 70 and the gate 102 permit input command pulses to be loaded at any time during the count cycle and coordinate the loading and counting so that they do not interfere with the comparing operation. These features permit command signals to be applied immediately to the servomotor as they become available and thus produce a substantially more rapid rate of data processing than that permitted by the prior art systems which require the count cycle to be completed and the analog error signal in the closed loop servo system to reach zero before subsequent command signals are accepted. The more rapid data processing of the present apparatus results in an improved output of data on the recording paper 22.

Figure 4:
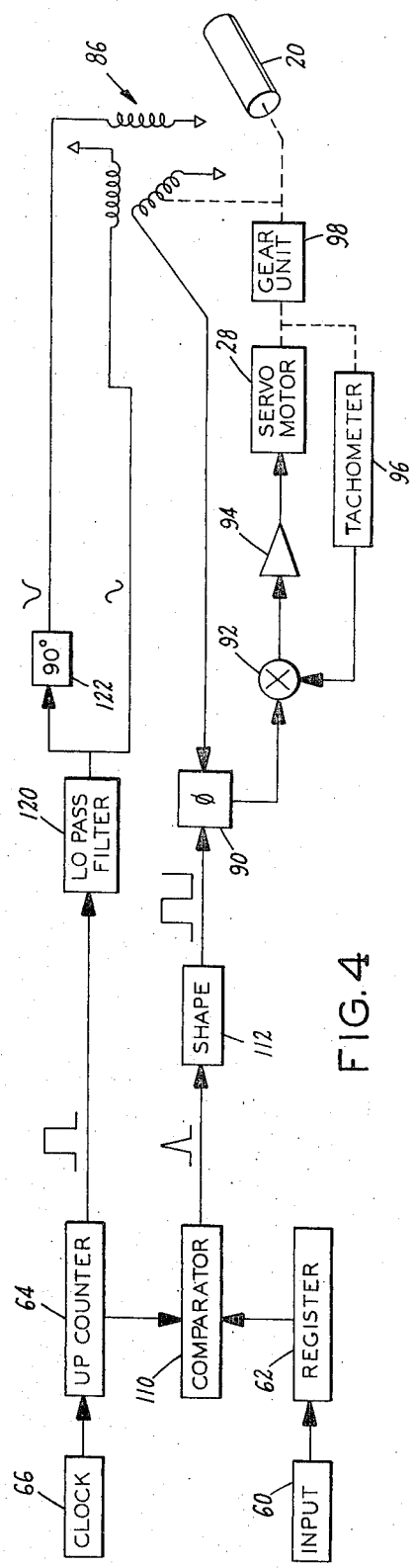
FIG. 4 is a schematic diagram showing another embodiment of the control apparatus for the plotting system of FIG. 1.

FIG. 4 shows an alternate embodiment of the control apparatus for controlling the closed loop servo system which rotates the plotting drum 20. Elements in the embodiment of FIG. 4 which are the same as the elements in the embodiment of FIG. 2 bear the same reference numerals. In the embodiment of FIG. 4, the reference waveform and the command waveform are again generated by comparing the count in the up counter 64 with the command in the register 64. The comparator 110, however, differs slightly from the comparator 70 of FIG. 2 in that a phased compare or coincidence signal is produced only once during each count cycle at the coincidence of all digits in the register 62 with the corresponding digits in counter 64. The coincidence signal is applied to a shaping network 112 which is a precision one-shot multivibrator that generates an output pulse having a pulse width or duration equal to one-half of the count cycle of counter 74. With the coincidence signal being produced during each count cycle at a phase of the cycle directly related to the command in register 62, the output of the multivibrator 112 becomes the command waveform, a squarewave which is phase modulated with respect to the reference waveform derived from the mostsignificant bit stage of the counter 64. The two phased waveforms are then utilized in the phase sensitive servo system to position the plotting drum 20.

The command waveform is applied to the phase detector 90. The reference waveform produced by the counter 64 is transmitted to a low pass filter 120 which derives the fundamental of the waveform. Sine and cosine signals which excite the field windings of the resolver 86 are produced by the fundamental with the assistance of a 90° phase lag circuit 122. The components and operation of the closed loop servo system as shown in FIG. 4 accomplish the positioning of plotting drum 120 in the same manner as that described with respect to the embodiment of FIG. 2.

While the present invention has been described in several preferred embodiments, it should be understood that numerous substitutions and modifications can be had without departing from the spirit of the invention. For example, although the register 62 and the counter 64 are designed to accept command signals coded in binary form, other forms of command coding, such as binary-coded-decimal, could also be used as long as a phased compare signal can be generated. Also, although the counter 64 is described as an up counter, it is merely necessary that the counter run cyclically in the same direction, either up or down, through a full count in each count cycle. Accordingly, the present invention has been described in several embodiments merely by way of illustration rather than limitation.

I claim:

1. Apparatus for controlling the output of a servomotor comprising: a cyclically driven digital counter having an output providing a periodic reference waveform at a frequency which is a submultiple of the digital counting rate; a digital command signal register having an input through which a single, complete digital command signal for positioning the servomotor output at one discrete position is received for temporary storage until another discrete position is commanded; input means connected with the input of the command signal register for loading new command signals into the register; comparator means connected between the digital counter and the command signal register for comparing the digital counts and the digital command signals and producing coincidence signals at each coincidence of the digital count and the digital command signals; timing means connected with the digital counter, the input means and the comparator means for stepping the digital counter, loading the command signal register and comparing the digital counts and the command signals respectively at distinctly different times; generating means connected to the comparator means and responsive to the coincidence signals for producing a periodic command signal waveform having the same period or frequency as the reference waveform and a phase relationship with the reference waveform uniquely related to the command signal in the register; the comparator means and the generating means cooperating whenever operating to continuously produce the periodic command signal waveform in response to a single and complete digital command signal stored in the command signal register; and phase responsive motor control means connected with the servomotor, the generating means and the digital counter and including a phase detector responsive to the reference waveform provided by the digital counter and the command signal waveform produced by the generating means for positioning the output of the servomotor in accordance with the phase relationship of the periodic waveforms.

2. Apparatus for controlling as defined in claim 1 wherein the command signal register is a digital up-/down counter.

3. Apparatus for controlling as defined in claim 1 wherein the command signal register comprises a digital register having a given plurality of bit stages for storing digital commands and the digital counter has a plurality of bit stages equal to the plurality of bit stages in the register.

4. Apparatus as defined in claim 3 wherein the generating means comprises a one shot multivibrator generating a pulse having a duration equal to one half the period of the periodic reference wave.

5. Apparatus for controlling as defined in claim 3 wherein the bit stages in the digital register are binary coded bit stages and the comparator means is connected to each of the bit stages in the digital register and the corresponding bit stages in the digital counter to produce one timing signal upon the identity of the bits in the register and the corresponding bits in the counter and another timing signal one half of a count cycle of the counter after the one timing signal.

6. Apparatus as defined in claim 5 wherein the generating means comprises a flip-flop set by the one of the timing signals from the comparator means and reset by the other of the timing signals to provide the phased and periodic command signal waveform.

7. Apparatus for controlling as defined in claim 1 wherein the digital counter is a multiple bit counter and the output of the digital counter providing the reference waveform is connected to the most-significant bit stage of the counter.

8. Apparatus for controlling as defined in claim 7 wherein the digital counter is a binary counter having outputs from both the most significant bit and the second most-significant bit stages; and wherein a waveform inverter and a frequency divider are connected to the output from the second most-significant stage.

9. Apparatus for controlling as defined in claim 8 wherein the phase responsive motor control means includes a feedback position resolver connected with the output of the servomotor and having field windings connected respectively to the most-significant bit stage of the digital counter and the frequency divider, and a rotor winding connected to the phase detector.

10. Apparatus for controlling as defined in claim 1 wherein the phase responsive motor control means further includes a cyclically rotatable position feedback sensor connected for cyclic rotation to the output of the servomotor.

11. Apparatus as defined in claim 10 wherein the position feedback sensor comprises a resolver having at least one field winding connected to the output of the digital counter providing the reference waveform and a rotor winding connected to the phase detector.

12. In a phase responsive servomechanism having a movable output member, an improved digital control apparatus for producing phased control signals to move the output member between a plurality of discrete positions comprising: a digital counter having a count capacity corresponding with the plurality of discrete positions of the movable member; a multiphase clock having multiple outputs providing time-phased pulse trains, each train having the same predefined pulse rate, a first of the outputs being connected in driving relationship with the counter to establish a digital counting rate corresponding to the predefined pulse rate; reference means connected to the stage of the counter for the most-significant digit to produce a periodic reference waveform at the same frequency as the counting cycles of the digital counter; a digital command register having a digital capacity corresponding to that of the counter; gated input means connected to the command register and responsive to a second of the outputs of the multiphase clock for loading commands into the register; comparing means gated into operation by a third of the outputs of the clock and connected to the digital counter and to the digital register for producing phased timing signals, the phases of the timing signals being referenced to the counting cycles and a function of the command signals in the register; and generating means connected to the comparing means and responsive to the phased timing signals for producing periodic command waveforms in phased relationship with the reference waveform, the phase relationships of the respective command waveforms with the reference waveform corresponding to the phase relationships of the respective timing signals and the counting cycles; the comparator means and the generating means cooperating at all times during the controlling operation to continuously produce the periodic command waveform with a given phase relationship in response to a complete digital command and without changing the digits stored temporarily in the command register.

13. An improved digital control apparatus as defined in claim 12 wherein the digital command register is another counter having the same digital capacity as the digital counter.

14. An improved digital control apparatus as defined in claim 12 wherein the digital counter comprises an up counter and the digital command register comprises a digital up/down counter.

15. An improved digital control apparatus as defined in claim 12 wherein the counter is a binary counter and the reference means further includes an inverter connected to the second most-significant digit stage of the counter and a frequency divider connected to the inverter, the divider having the characteristic of reducing frquencies by a factor of two whereby two phased reference waveforms are generated.

16. A control apparatus receiving digital commands and producing two periodically varying waveforms phased in accordance with the digital commands received comprising:

a digital command register having a selected number of bit stages for receiving a single and complete digital command corresponding uniquely to a specific and desired phase of the waveforms and for storing the command temporarily until a new phase is desired;

a cyclically driven digital counter having bit stages corresponding to the bit stages of the command register and an output from one of the bit stages regularly providing one of the periodic waveforms as a reference at a frequency which is a submultiple of the digital counting rate of the counter;

gated digital comparator means connected to the bit stages of the command register and the digital counter for producing coincidence signals at each coincidence of the digital count in the counter and the digital command in the register and at each coincidence of the digital count and the digital command in all but the most significant bit stages of the counter and the register;

shaping means connected to the comparator and responsive to the coincidence signals from the comparator for producing the other periodic waveform phased with the reference waveform in accordance with the digital command in the register; and gated input means connected to the digital command register for controlling the entry of new commands into the register; and a multiphase clock having three outputs providing three time-phase trains of non-overlapping pulses, the outputs being connected with the cyclically driven counter, the gated comparator means and the gated input means for driving the counter, gating the comparator means on and entering new commands in the command register at respectively different times.

17. Apparatus for controlling the output of a servo- motor as defined in claim 1 wherein the timing means is a multiphase clock having different clock outputs in time-phased relationship connected respectively to the digital counter, the input means and the comparator means.

18. Apparatus for controlling as defined in claim 17 wherein the multiphase clock has four outputs providing time-phased pulse trains, two of outputs being connected to the comparator means for comparing the digital counts and the command signals before and after a step of the digital counter and a loading of a new command signal into the digital register.

* * * * *